(12) United States Patent
Ainsworth et al.

(10) Patent No.: US 6,437,995 B2
(45) Date of Patent: Aug. 20, 2002

(54) CONTROL SYSTEM ADAPTED TO CONTROL OPERATION OF AN AC/DC CONVERTER

(75) Inventors: John Desmond Ainsworth, Staffordshire; Robert S. Whitehouse, Stafford, both of (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/785,674

(22) Filed: Feb. 16, 2001

(30) Foreign Application Priority Data

Feb. 18, 2000 (GB) ............................................. 0003706

(51) Int. Cl.[7] .............................................. H02M 5/45
(52) U.S. Cl. ......................................... 363/37; 363/39
(58) Field of Search ...................... 307/105; 363/34–37, 363/39, 40, 44, 84, 85, 95, 125, 135, 138

(56) References Cited

U.S. PATENT DOCUMENTS

| | | | |
|---|---|---|---|
| 5,235,503 A | | 8/1993 | Stemmler et al. |
| 5,666,275 A | * | 9/1997 | Inouchi et al. ............... 323/207 |
| 5,717,580 A | * | 2/1998 | Karlecik-Maier ............ 363/35 |
| 5,780,939 A | | 7/1998 | Christl et al. |
| 5,917,718 A | * | 6/1999 | Palsson et al. ................ 363/35 |

FOREIGN PATENT DOCUMENTS

| | | |
|---|---|---|
| EP | 0 278 491 A2 | 8/1988 |
| EP | 0 419 217 A2 | 3/1991 |
| EP | 0 489 948 A1 | 6/1992 |
| GB | 2 008 868 A | 6/1979 |
| GB | 2 229 870 A | 10/1990 |

* cited by examiner

Primary Examiner—Edward H. Tso
Assistant Examiner—Gary L. Laxton
(74) Attorney, Agent, or Firm—Kirschstein, et al.

(57) ABSTRACT

A control system to control at least one of the thyristor converters (1) or (2) of an ac system (7,8) or (9,10) connected by busbars (5,6) and transformers (3,4) to the converters (1,2) which have their dc sides connected by a dc link, for example inductor (11). Each thyristor converter receives firing pulses from a firing control (12) or (13), including a firing angle control (18) and a summing junction (16) receiving a control current signal input (17) and a current signal (14) which is a function of converter operation. An electrical power measurement is made of one of the ac systems, for example the ac system (7,8,5) and in accordance with that power measurement a signal which is a function thereof is produced as an output (19) from an integral two-axis ac servo control having demodulator, integrator and modulator circuit receiving the power measurement signal as input. Signal (19) is a function of the cross-modulation noise component caused by interaction of electrical noise from the two converters. This signal (19) is input to at least the firing control (12) to vary the firing of thyristor converter (1) so as to remove from at least the ac system (7,8,5) the cross-modulation noise. Signal (19) may also be input to firing control (13).

12 Claims, 4 Drawing Sheets

CONTROL SYSTEM ADAPTED TO CONTROL OPERATION OF AN AC/DC CONVERTER

BACKGROUND OF THE INVENTION

This invention relates to a control system adapted to control the operation of an ac/dc converter, particularly in applications where a pair of ac systems are linked by two ac/dc converters connected by a dc link.

Systems are well known where a pair of ac systems are linked by two ac/dc converters connected by a dc link. For instance propulsion systems for ships can include such a link wherein an ac supply of fixed frequency is fed into an ac/dc converter acting as a rectifier to produce dc. This dc is then fed into an ac/dc converter acting as an inverter to drive a motor. The advantage of this arrangement is that the firing angle of the inverter can be controlled to adjust the speed of the motor without affecting the first ac system.

Dc links are also known to exist between the supply grids of neighboring countries.

However, as is well known the ac/dc converters can produce electrical noise at harmonic frequencies of the ac supply frequencies. These harmonic frequencies can pass through the ac/dc converters and give rise to cross modulation frequencies on the ac systems. These cross modulation frequencies appear as noise on the ac systems, that is they can lead to voltage flicker (causing lamps, etc. to flicker) and can lead to resonances in electro-mechanical systems. An example of such an electro-mechanical system is a turbine/generator arrangement provided in power stations. The turbine and generator are linked by a shaft which has a natural frequency. The natural frequency of this system is of the same order as the cross modulation frequencies and it is theoretically possible that the system (in particular the linking shaft) could be damaged through resonance of the system due to excitation by the cross modulation. It is therefore clearly advantageous to remove this cross modulation.

SUMMARY OF THE INVENTION

According to the invention there is provided an auxiliary control system adapted to control at least one of the converters of an ac/dc system comprising a pair of ac/dc converters with a dc link extending between them linking two ac systems, at least one of said converters comprising a plurality of switches, a main control means providing converter operating signals to said switches, said auxiliary control system being arranged to take an electrical power or reactive power measurement of one of the ac systems and in accordance with that measurement cause the controlled converter to operate so as substantially to remove from the ac system a cross modulation noise component caused by interaction of electrical noise from the two converters.

Conveniently the auxiliary control system is additional to the main control systems of the converters.

An advantage of such an auxiliary control system is that the cross modulation component that had previously caused interference within the ac electrical systems connected by the dc link can be removed. This can help to remove or reduce the likelihood of damage to electro-mechanical systems within those ac systems or unwanted effects such as light flicker.

The controlled converter may be provided with main control means providing converter operating signals or pulses.

Preferably the auxiliary control system comprises demodulating means, integrating means and modulating means, and can include an input which is a function of said power or reactive power measurement and an output to modulate said control means of said main controlled converter.

In one embodiment the auxiliary control system comprises an integral two-axis ac servo system comprising aforesaid demodulating, integrating, and modulating means and said input being input to said integral two-axis ac servo system arranged to provide said output.

At least one or each of said ac/dc converters may be a thyristor converter or a voltage-source converter.

In one embodiment gain and phase settings of said auxiliary control system may be substantially fixed.

In another embodiment gain and phase settings of said auxiliary control system can be varied in dependence on at least one measured value of an electrical phenomenon in said ac/dc converter according to a pre-determined characteristic. Said phenomenon may be the dc voltage of said converter and/or said phenomenon may be the dc current.

Gain and phase settings of said control system can alternatively be set to values substantially equal to the reciprocal of a measured complex value of total loop gain of said control system and ac/dc converters and ac systems excluding said integrating means.

An automatic measurement of said total loop gain may be carried out after any substantial disturbance in the operation of said ac/dc converters and in which said measurement remains effective in determining said gain and phase settings until the next such disturbance.

Said automatic measurement of total loop gain may be by injecting pre-determined signals into said modulating means and measuring resulting outputs of said de-modulating means.

Advantageously two said total loop gain measurements may be performed in succession with different injection signals and a result of said gain measurements is calculated from a difference between the said two gain measurements.

BRIEF DESCRIPTION OF THE DRAWINGS

There now follows, by way of example only, description of the invention with reference to the accompanying drawings in which:-

DETAILED DESCRIPTION OF THE PREFERRED EMBODIMENTS

Figure 1:
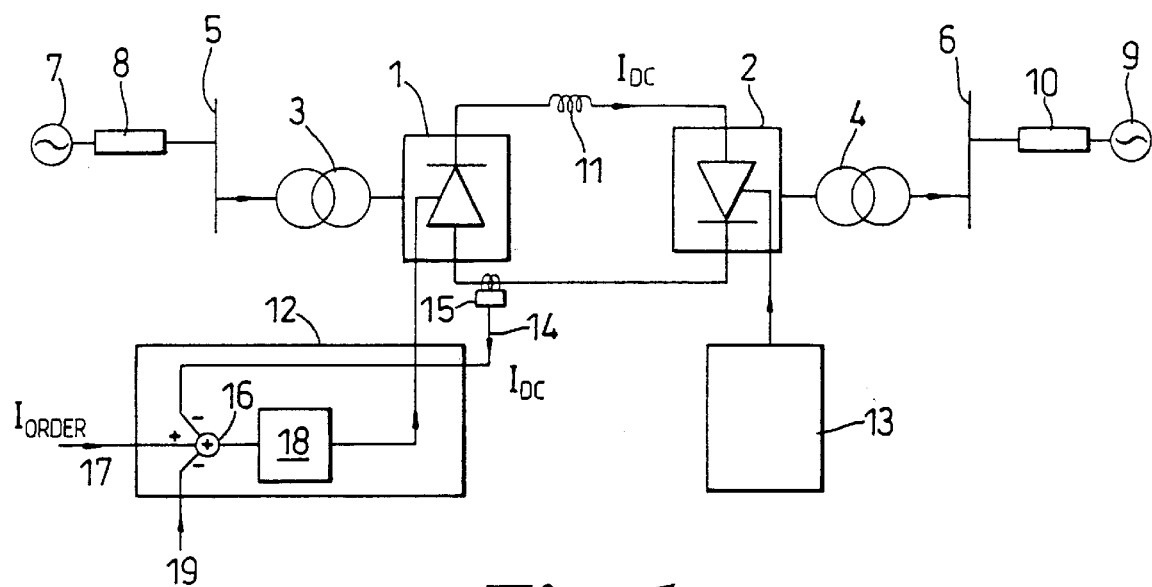
FIG. 1 shows a general arrangement of the main circuit and main converter controls for realizing the present invention.
Figure 6:
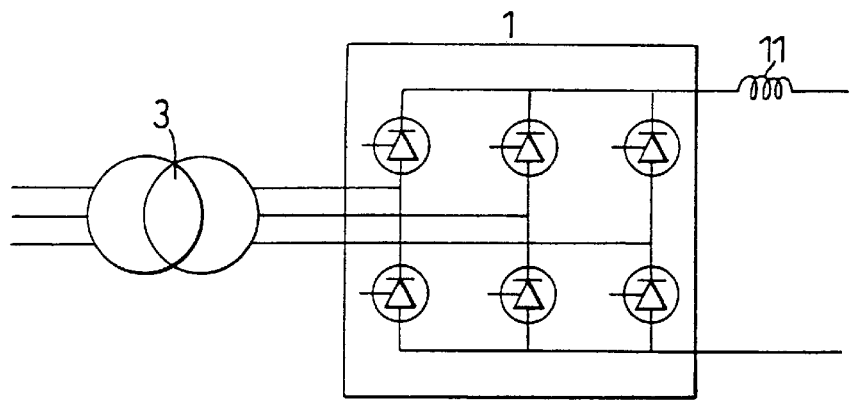
FIG. 6 shows more details of a basic 6-pulse converter circuit using thyristors.

The control system of this invention is used to control two ac/dc converters linked by a dc link. FIG. 1 shows a first example of an arrangement of this, represented as single-line equivalents for converters 1, 2, transformers 3, 4, ac system busbars 5, 6, ac system impedances 8, 10, and ac system emf's 7, 9. This is for thyristor converters. FIG. 6 shows more detail of one of the converters, in the form of a bridge circuit 1 using six thyristors in a 6-pulse arrangement. It is to be understood that for high rated power each thyristor shown may, in reality, consist of many thyristors in series and/or parallel; in addition an alternative arrangement, not shown, may be two such bridges connected in series, connected on their ac sides to separate transformer secondaries respectively in star and delta configuration, in the known form of a 12-pulse group. The configuration shown may be used for example in high-voltage direct-current (HVDC) applications, or for driving an ac electric motor.

As shown the converters are connected on their dc sides via a single inductor 11. However, this connection may alternatively be direct (no dc inductor) or via an overhead dc line or a dc cable, or other form of dc system.

In normal operation each converter will operate with its own main control system, shown respectively as 12, 13. Typically if converter 1 is operating as a rectifier its main control may adjust dc current to an ordered value, and converter 2 will operate as an inverter, adjusting dc voltage to an ordered value. This is shown in further detail for converter 1 only (although a similar arrangement would be applied to converter 2), where a dc current signal 14 is shown derived from a dc current transformer 15, and applied to a summing junction 16. The difference between this and a current order signal 17 is then effectively applied to a firing angle control 18 to converter 1. A further modulating signal 19 will be described later.

It has been found that the ripple components caused by each converter in the dc line current can cross-modulate to form modulations on the ac side of each converter.

As a first cross-modulation example, consider the effect of negative sequence unbalance in the ac system of converter 1. If the nominal ac system frequency in this is $f_1$ then the effect is to generate a component at a frequency of $2\,f_1$ on dc current; similarly converter 2 may generate a component at $2\,f_2$ on dc current.

The cross-modulation seen in each ac system is then at frequencies of $(2\,f_1 \pm 2\,f_2)$. This will be defined as $2^{nd}$ harmonic cross-modulation. Normally only the difference frequency component at $(2\,f_1 - 2\,f_2)$ is of practical importance. As an example, if the system frequencies are each nominally 50 Hz but with a variation of up to ±3 Hz, then the principal modulation frequency may vary from zero to 12 Hz. If the nominal system frequencies are different, for example 50 Hz and 60 Hz, also with 3 Hz variations, the modulation frequency may vary between 8 Hz and 32 Hz.

As a second example of cross-modulation, assume each converter to be a 12-pulse thyristor arrangement. Ripple components will exist on dc current at frequencies of $12\,f_1$ and $12\,f_2$ due to the normal harmonics of the converters, giving $12^{th}$ harmonic cross-modulation in each ac system at a frequency of $(12\,f_1 - 12\,f_2)$. If each system frequency is 50 Hz nominal with variations up to 3 Hz, the cross-modulation may be at frequencies from zero to 72 Hz. Cross-modulation may also occur at other frequencies such as $4^{th}$ harmonic, or between current components at different harmonic orders, but the effects of these are generally small.

In each of the examples above the effect will be of modulation in each ac system. This will generally be small, usually less than 3% of rated power, but can be sufficient to cause unacceptable flicker in voltages of supplies to consumers in the ac systems, and can excite mechanical shaft resonances in machines in the ac systems, possibly leading to over-stressing of shafts. The flicker may manifest itself as flickering lights, or other phenomena.

A second example of coupled ac/dc converters (not shown) may be similar to FIG. 1 but based on voltage-source converters. These differ in that they use switching devices such as insulated gate bipolar transistors (IGBT) rather than thyristors, and that instead of the series inductor 11 in FIG. 1 they may share a common capacitor connected in shunt to each on their dc sides. Alternatively such converters may each have their own dc capacitor, coupled via a dc line or cable or single inductor, as for the first case.

Cross-modulation may occur in this second example, particularly at $2^{nd}$ harmonic caused by negative sequence unbalance of the ac systems as before. The mechanism is different in that it is caused by $2^{nd}$ harmonic components of voltage on the shared dc capacitor or dc system, rather than by shared $2^{nd}$ harmonic currents as in the first example. The effect is however similar in that cross-modulation components may appear in each ac system at $(2\,f_1 \pm 2\,f_2)$. It is possible in all cases to reduce the cross-modulation components by adding passive filters in the dc system, for example by making the inductor 11 in FIG. 1 very large, or by adding shunt filters on the dc side, but the cost of these can be large.

It has been found that cross-modulation components in the ac systems of two coupled ac/dc converters can be nulled by injection of a small modulating signal at the frequency of the cross-modulation, with suitable amplitude and phase, into the main control system of one or both converters.

Figure 2:
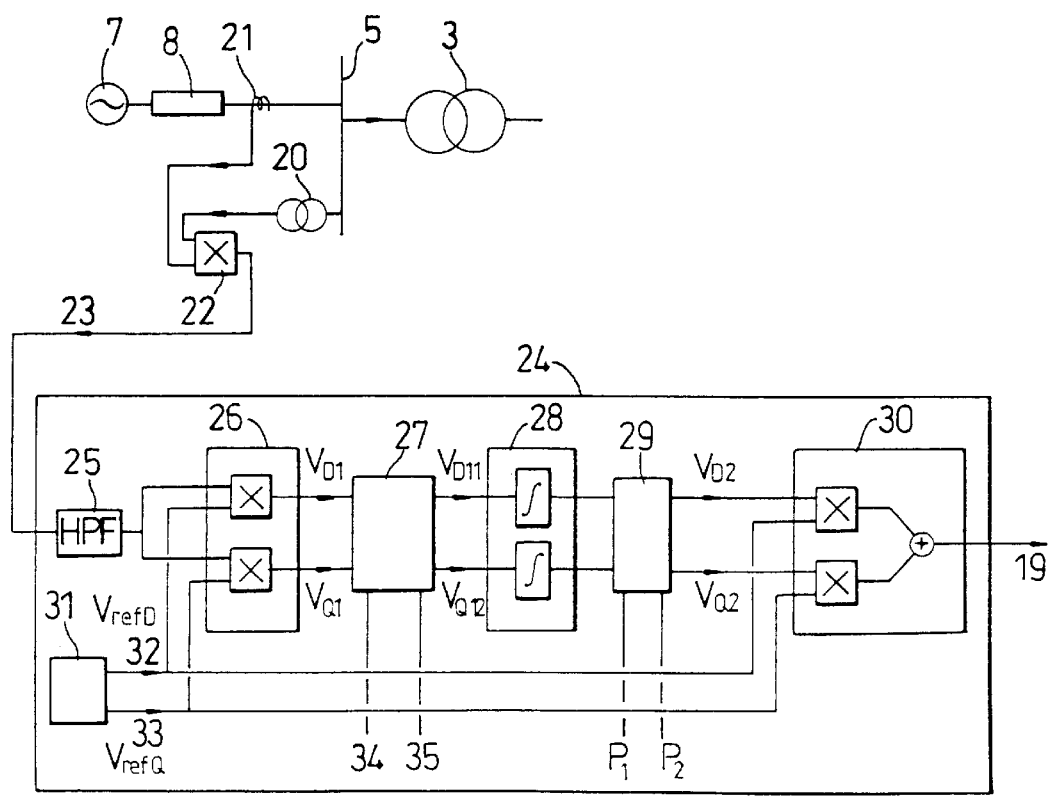
FIG. 2 includes a general arrangement of an auxiliary control system according to the invention.

FIG. 2 shows the general arrangement of the auxiliary control system for the generation of one such signal according to the invention. The description will initially be for nulling of $12^{th}$ harmonic cross-modulation. This description will be in mathematical terms, based on functions such as add, or multiply, or divide, but it is to be understood that these represent physical control equipment operating in real time.

In the upper part of FIG. 2 is shown a means of generating a measurement of total converter power. This shows the addition of a voltage transformer 20 and a current transformer 21 to the ac system of converter 1. The outputs of these are multiplied in multiplier 22 to form a power signal 23. Although shown as a single line diagram, it is to be understood that these components may in reality be three-phase, including three multipliers and a summing junction (not shown) so that signal 23 is proportional to total 3-phase power. Providing a measure of power in this manner is necessary because the cross modulation component that the invention tries to cancel is not apparent in a suitable form from signals from one single voltage and a single current sources.

The auxiliary control system is shown as block 24. This is a form of integral two-axis ac servo control, having two channels, respectively to generate the direct and quadrature components of the desired modulation 19 to the main converter control system 12 (as shown in FIG. 1).

The input signal to the auxiliary control system 24 is the ac power signal 23 derived from the multiplier 22 and the voltage and current transformers 20,21 as described above. This will contain a component proportional to the power modulation to be nulled, plus a large dc component proportional to the mean ac power. The dc component is blocked by a high-pass filter 25. The signal then passes through a demodulator 26 containing two multipliers, forming two signals with dc components $V_{D1}$ and $V_{Q1}$ respectively proportional to the direct and quadrature components of measured power modulation.

The multipliers within the demodulator 26 multiply the signal passing from the high pass filter to the demodulator by a reference signal which is derived as will described hereinafter.

The signals $V_{D1}$ and $V_{Q1}$ then pass through a gain/phase shift unit 27 described later, then an integrator block 28 containing two integrators. From here the signals pass via an injection block 29 also described later, and then via a modulator block 30 containing two multipliers and a summing junction which combines the two signals into a single signal. This single output signal is the modulation output signal 19, applied to the main control system of converter 1, as in FIG. 1. It will be appreciated by the skilled person that the prior art methods of controlling a pair of ac/dc converters linked by a dc link does not make use of this control signal 19. The control signal 19 is produced for putting the invention into effect.

Reference signals in the form of two ac signals 32 and 33 in quadrature at the cross-modulation frequency ($12 f_1 - 12 f_2$) are required by the demodulator 26 and modulator 30. (It should be remembered that this control scheme is being described in relation to a method of cancelling the cross modulation produced by the $12^{th}$ harmonic). These may be generated from the 3-phase busbar voltages of each converter by first generating 2-phase signal systems at the $12^{th}$ harmonic frequencies ($12 f_1$ and $12 f_2$) of the respective ac systems; this may be by known frequency multiplication means, such as phase-locked oscillators.

Figure 3:
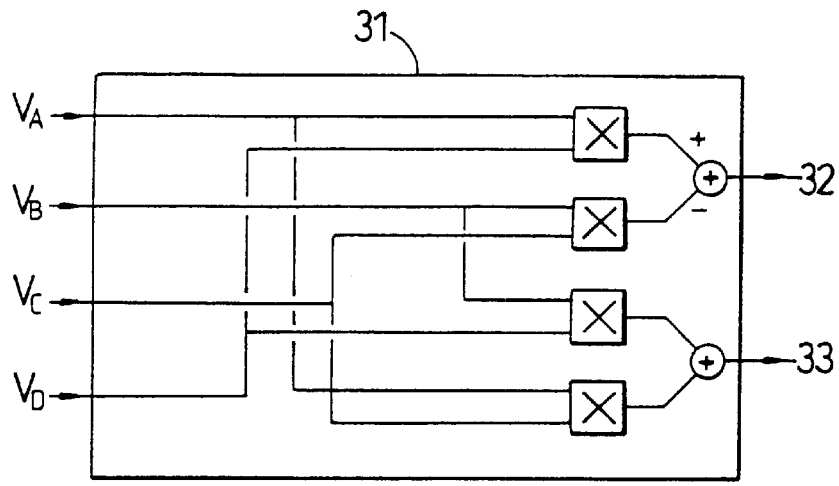
FIG. 3 shows the generation of the reference signals in FIG. 2.

The production of these references 32 and 33 is shown in FIG. 3. The input signals to reference generation means 31 are derived as described above from the ac bus bars and are $v_A$, $v_B$, $v_C$, and $v_D$. These inputs define the instantaneous values of the resulting ac signals and are defined as follows:

$$V_A = \sin A$$
$$v_B = \cos A$$
$$v_C = \sin B$$
$$v_D = \cos B$$
where
$$A = 12(2\pi f_1)t$$
$$B = 12(2\pi f_2)t$$
$$t = \text{time}$$

The required reference signals $v_{refD}$ (signal 32) and $v_{refQ}$ (signal 33) are therefore obtained via block 31, shown in FIG. 3. Block 31 effectively solves the trigonometrical relations:

$$v_{refD} = \sin(A-B) = \sin A \cos B - \cos A \sin B$$
$$v_{refQ} = \cos(A-B) = \cos A \cos B + \sin A \sin B$$

These two signals are shown as 32, 33 in FIGS. 2 and 3.

In order to describe basic operation it is convenient to initially ignore the gain/phase shift block 27 and the injection block 29 of FIG. 2 and consider that signals pass straight through these blocks 27 and 29 without change. Then ideally the auxiliary control system should settle to a steady state condition in which the resulting modulation signal 19 has the correct magnitude and phase to null the $12^{th}$ harmonic modulation in the ac system of converter 1.

The integrators within block 28 then have mean input signals, defined as $V_{D11}$ and $V_{Q11}$ as in FIG. 2, which are then practically zero. The integrator outputs are finite, and settle to values such as to give the appropriate values of $V_{D2}$, $V_{Q2}$ so that the cross-modulation components in ac system 5, 8, 7 are reduced to zero or near zero.

In practice, as in any closed-loop control system, the settings of loop gain and phase must be within reasonable limits to obtain a suitable performance and avoid instability. Adjustments to each of these may be via gain/phase shift unit 27 discussed below, which modifies the signals $V_{D1}$ and $V_{Q1}$ to produce $V_{D11}$ and $V_{Q11}$.

A first method of arranging gain and phase control settings is simply for these to be fixed at compromise values determined by calculation or experiment. This may be practicable where the operating conditions of the main converter are relatively constant. This method may be by control setting signals 34, 35 from fixed sources applied to gain/phase shift 27. Details of the latter are shown in the known form of FIG. 7. This contains four multipliers, two adders, a SINE function and a COSINE function. If the gain and phase input control signals are respectively defined as G and $\theta$ this block generates output signals $V_{D11}$ and $V_{Q11}$ which are related to inputs $V_{D1}$ and $V_{Q1}$ by:

$$V_{D11} = G(V_{D1} \cos\theta - V_{Q1} \sin\theta)$$
$$V_{Q11} = G(V_{D1} \sin\theta + V_{Q1} \cos\theta)$$

These are known transformations, and in terms of two-axis quantities give a gain change in the ratio G, and a phase change by $\theta$ radians. Block 29 is not required in this method. Gain G may be set at a compromise value between too small a value, giving slow response, and too large a value, which may give control loop instability. In addition there is always an optimum phase setting $\theta$ giving best stability; a value of phase setting differing from this by more than 90° will give instability; some lesser tolerance such as ±30° is acceptable.

Figure 9:
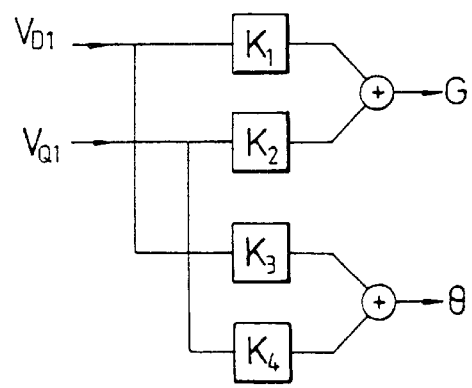
FIG. 9 shows additional controls for the second control method.

A second method of determining settings is possible by automatic open-loop adjustment if only moderate or well-defined changes in the converter operating conditions occur. This may be for example from a measurement of main converter dc voltage and current, and automatic adjustment of phase and gain from pre-determined relations to these. This may be suitable for a medium range of operating conditions. FIG. 9 shows a suitable arrangement for this, containing four multiplying constants $K_1$, $K_2$, $K_3$, $K_4$, and two adders. The input signals are shown as dc voltage $V_{DC}$ and dc current $I_{DC}$, obtained from the main dc system respectively from a dc voltage divider and a dc current transformer, not shown. The constants may be chosen to give compromise values for gain G and phase $\theta$ which are effective over a wider range of converter working conditions than for the first control method. In this method block 29 is again not required.

A third method of determining the optimum gain and phase settings may be used, in which these are calculated from a brief preliminary test of the main system, with the auxiliary control loop open. This may be carried out automatically for example when the main converter is first deblocked or otherwise switched on, or on the occurrence of any substantial disturbance to the system being controlled.

To understand this method, it is first necessary to define a system gain as $G_s$, measured from the input of the modulator block 30 (signals $V_{D2}$, $V_{Q2}$) through the main converter control system, the main converter, the whole of the dc and ac main systems, the power measurement circuit, and the demodulator 26. (This excludes only blocks 27, 28, 29 of FIG. 2). Since the dc voltages ($V_{D1}$, $V_{Q1}$) and ($V_{D2}$, $V_{Q2}$) represent the complex components of ac quantities, $G_s$ will in general be complex, of the form:

$$G = G_D + jG_Q$$

It can then be shown that if the equivalent transfer function of block 27 is arranged to be (1/$G_s$), then the equivalent phase of this will automatically have exactly the optimum value for best stability, and a gain which can also be suitable (independent of the magnitude of G) if a suitable extra fixed gain is applied also, for example at the integrator inputs.

Figure 4:
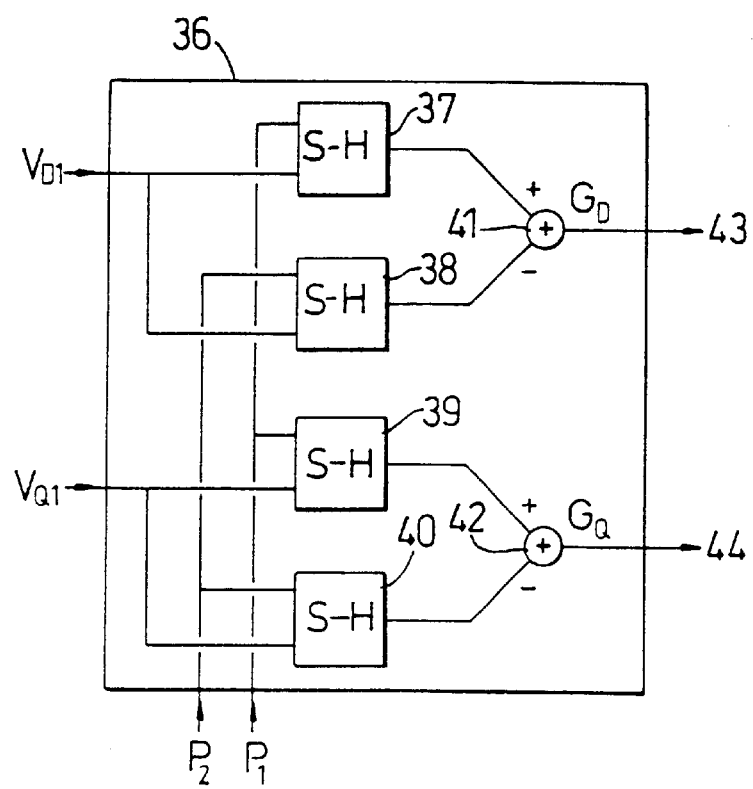
FIG. 4 is a schematic circuit for measuring the loop gain (G) of the circuit being controlled by the control arrangement of FIG. 2.

The blocks relevant to this method are 27 (which is different to that in the first two methods), 29 and a measuring block 36 (which is shown in FIG. 4). The measuring block is in addition to the other blocks of the auxiliary control system 24 shown in FIG. 2.

A measurement of G can be carried out in principle simply by injecting known signals into the modulator 30 and measuring the resulting signals $V_{D1}$ and $V_{Q1}$. The effective frequency of measurement referred to the main system is that of the reference source, i.e. (12 $f_1$–12 $f_2$) in this example (this is being described in relation to cancelling the 12$^{th}$ harmonic). If the injection signals are for example equivalent as a pair to (1+j0) per unit of rated converter power, then gain $G_s$ can be shown to be equivalent to ($V_{D1}$+j$V_{Q1}$) where $V_{D1}$ and $V_{Q1}$ are the measured values. In practice a much smaller injection signal, typically 0.01 per unit, will be desirable to keep down system disturbance due to the test; a suitable scale factor can allow for this. In reality a single measurement as described will give an incorrect answer, because of the presence of cross-modulation components at frequency (12 $f_1$–12 $f_2$) in the main circuit, other than those caused by the injection. The proposed method according to the invention therefore performs two tests in succession, one with injection as above, the second with different injection values, preferably (0+j0). It can then be shown that the true value of system gain G is equal to the difference between the results for the respective tests, and is independent of the existing cross-modulation components in the main system.

A suitable means for carrying out the measurements is shown in FIG. 4, and may be described as follows:

1. Assume the first test starts at time t=0. A strobe pulse $P_1$ is generated from suitable timing means, not shown, starting from t=0 and ending at time t=T where T may be for example 1 second.
2. During this time the injection block 29 switches its two outputs to the desired values, for example respectively 0.01 and zero, first disconnecting these from the integrators.
3. At time t=T strobe pulse $P_1$ switches off. Sample-and-hold circuits 37 and 39 in block 36 (FIG. 4) will thereafter store the values of $V_{D1}$ and $V_{Q1}$ measured at time t=T.
4. At time t=T a second strobe pulse $P_2$ then starts, and continues for a further time of T, i.e. from t=T to t=2T.
5. During this time the injection block 29 switches each of its outputs to zero, i.e. an equivalent injection of (0+j0).
6. At time t=2T strobe pulse $P_2$ turns off, leaving a second pair of values of $V_{D1}$ and $V_{Q1}$ on the outputs of sample-and-hold circuits 38, 40 in block 36 (FIG. 4).
7. From t=2T onwards outputs 43, 44 of the summing junctions 41, 42 in block 36 give the difference of the two tests above; as stated above, this represents the true system gain G in equivalent complex form.

The reason for the two time delays T above is to allow the complete system to settle to a steady condition before sampling. Smaller or larger times for these may be used, depending on the actual signal frequency ranges expected.

The switching or injection block 29 is not shown in detail, but is relatively simple, containing only switches operated by pulses $P_1$ and $P_2$, and dc signal sources, as described above.

It is then required to control the gain/phase block 27 such that it has an equivalent transfer function of 1/G, i.e. the equivalent complex reciprocal of the signals from the measuring block 36. Assume G is expressed as $G_D+jG_Q$. Then the real and imaginary components of its reciprocal can be shown to be:

$$V_{D11} = (V_{D1} G_D + V_{Q1} G_Q)/(G_D^2 + G_Q^2)$$
$$V_{Q11} = (V_{Q1} G_D - V_{D1} G_Q)/(G_D^2 + G_Q^2)$$

Figure 5:
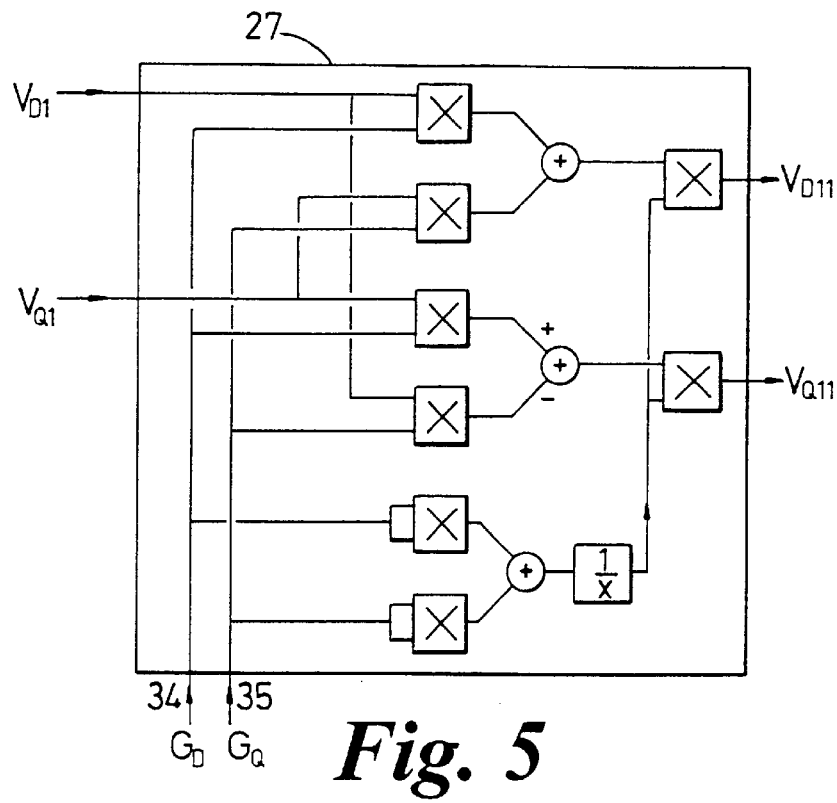
FIG. 5 is a schematic circuit for inserting the function $(1/G_s)$ in the circuit of FIG. 2.
Figure 8:
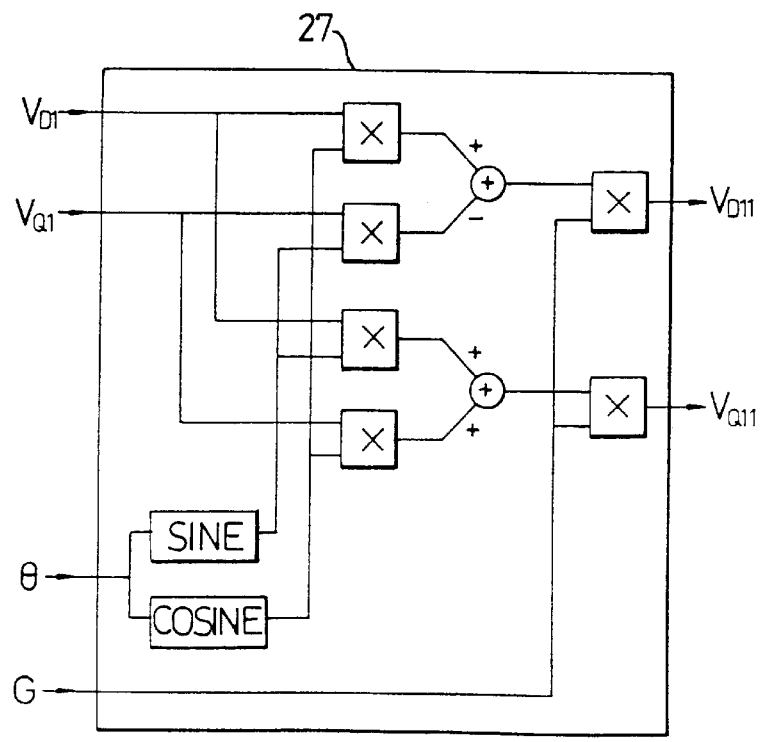
FIG. 8 shows details of gain and phase change block.

A suitable method of implementing these is shown in block 27 in FIG. 5. This contains only multipliers, summing junctions and one reciprocal. (The alternative of converting 1/G to polar form, with block 27 also in polar form, is much less convenient, particularly in on-line digital control systems, which would require sine, cosine, arctangent, and square-root functions, which take much computing time).

This third method of determining control settings will operate in a wide range of system conditions, for example where there are resonances between an ac system impedance and local shunt filters associated with the main converter, particularly where such resonant frequencies may change substantially with changes in the ac system or in converter operation.

The description above refers only to an auxiliary control system having an input from measured power at one converter, hence in principle only nulls cross-modulation power in that converter; in practice the energy storage in the converters and dc system is relatively low, so that power modulations in the dc circuit and in the 'remote' ac system are also substantially attenuated.

However it is possible that modulation in reactive power in each ac system may still be substantial; this may have relatively little effect on machine torques but can affect ac voltage flicker. It is then possible to provide two auxiliary control systems substantially as described above, respectively to null the real and reactive components of cross-modulation. These can share the ac reference sources in common, but are otherwise separate. A preferred method of applying these is for the measurement and control of real power modulation to be at one converter, and the measurement and control of reactive power modulation to be at the other converter, though different conditions of these are possible.

The control system description above was for an auxiliary control system to null 12$^{th}$ harmonic cross-modulation. The method may be applied alternatively to a control system for any other cross-modulation frequency, for example at 2$^{nd}$ harmonic as described previously. The changes required are relatively few, being principally to the generation of reference signals, which may be by the same method but from appropriately different basic frequencies.

It will also be clear to those skilled in control art that filters (omitted above) may be required in various parts of the auxiliary control system, to reduce the effects of signal components at unwanted frequencies, for example those due to other types of cross-modulation.

If settings are adjusted by the third method it will also be required to provide means to automatically re-trigger the test process described for determining control settings in various circumstances. This will normally be required on normal start-up of the main converter by either deblocking or closing a main circuit-breaker. A re-test should preferably also occur on recovery of the power system from a major disturbance such as a temporary ac or dc system fault. Yet another case will be where the working conditions of the main converter or ac system change relatively slowly, into a condition where the initial settings for the auxiliary control are unsuitable, and it may gradually become unstable. This can be detected by a measurement of the integrator input voltages $V_{D11}$ and $V_{Q11}$; when either of these becomes finite, in excess of a small set value for a set time, for example 1 second, a re-test can be triggered.

An example of a system where working conditions of the main converter or ac system change relatively slowly would be a DC link between two ac supply grids, which may be the supply grids of neighboring countries. In such systems the supply frequencies are independently set and therefore are likely to drift over time; such drifting could cause the control functions to become unstable, and hence can trigger a re-test as said above. An auxiliary control system with functions as described may be implemented by electronic means known in control system art, such as by analogue electronic devices, or digital electronic devices, provided that in the second case calculations are carried out at an iteration frequency substantially greater than the relevant harmonic frequencies.

Figure 7:
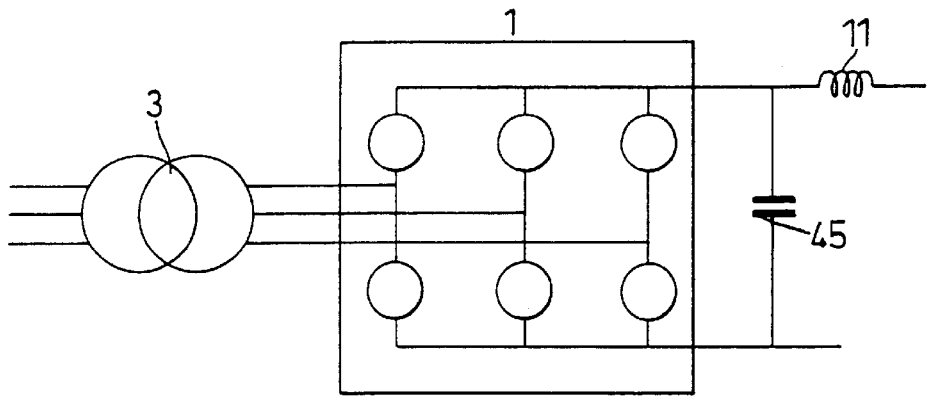
FIG. 7 shows details of a voltage-source converter circuit using transistors.

The description above was particularly relevant to thyristor converters. However, as mentioned in the introduction the invention is also applicable where one or each converter is a voltage-source converter. FIG. 7 shows one type of voltage-source converter in the form of one 3-phase bridge. The switching elements, shown as plain circles, may each consist of a transistor connected in reverse parallel with a diode, or series and/or parallel combinations of these. Other types of voltage-source converter are also applicable, such as a single-phase bridge, or two bridges in a "12-pulse" arrangements.

In each case one or more shunt capacitors 45 may be connected across the dc side of the or each bridge. If both converters are voltage-sourced converters, they may be coupled on the dc side via an inductor 11, or this may be omitted; in the latter case one capacitor 45 only is required.

A characteristic of voltage-sourced converters is normally that the transistors are switched on and off at a relatively high frequency, in a switching time pattern which inherently nulls many harmonics as seen on the ac systems. Thus for example, for a 3-phase converter, assuming balanced conditions, there may be virtually zero ac harmonics up to $23^{rd}$ harmonic or usually higher, hence $12^{th}$ harmonics on the dc current, and $12^{th}$ harmonic cross-modulation, may not be significant. However, the effect of negative-sequence unbalance in one or both ac systems is similar to that in thyristor converters, in that it caused $2^{nd}$ harmonic on the dc current, and $2^{nd}$ harmonic cross-modulation. The invention is also applicable in reducing such $2^{nd}$ harmonic cross-modulation effects in voltage-sourced converters to small values or zero, as for a thyristor converter.

I claim:

1. An auxiliary control system adapted to control at least one of the converters of an ac/dc system comprising a pair of ac/dc converters with a dc link extending between them linking two ac systems, at least one of said converters comprising a plurality of switches and including a main control means providing converter operating pulses or signals to said switches, said auxiliary control system being arranged to take an electrical power or reactive power measurement of one of said ac systems and in accordance with said measurement cause said at least one of said converters to operate so as to substantially remove from said ac system a cross modulation noise component caused by interaction of electrical noise from said two converters.

2. An auxiliary control system as claimed in claim 1, in which said auxiliary control system comprises an integral two-axis ac servo system comprising demodulating means, integrating means and modulating means, said measurement of electrical power or reactive power being input to said demodulating means and an output of the modulating means modulating said switches of said at least one converter.

3. A control system as claimed in claim 1, in which at least one or each of said ac/dc converters is a thyristor converter.

4. An auxiliary control system as claimed in claim 1, in which at least one or each of said ac/dc converters is a voltage-source converter.

5. An auxiliary control system according to claim 1 in which gain and phase settings of said auxiliary control system are substantially fixed.

6. An auxiliary control system according to claim 1, in which gain and phase settings of said auxiliary control system are varied in dependence on at least one measured value of an electrical phenomenon in said ac/dc converter according to a pre-determined characteristic.

7. An auxiliary control system as claimed in claim 6, in which said phenomenon is the dc voltage of said converter.

8. An auxiliary control system as claimed in claim 6, in which said phenomenon is the dc current.

9. An auxiliary control system as claimed in claim 2, in which gain and phase settings of said auxiliary control system are set to values substantially equal to a reciprocal of a measured complex value of total loop gain of said main control systems and ac/dc converters and ac systems and auxiliary control system excluding said integrating means.

10. An auxiliary control system as claimed in claim 9, in which an automatic measurement of said total loop gain is carried out after any substantial disturbance in the operation of said ac/dc converters and in which said measurement remains effective in determining said gain and phase settings until the next such disturbance.

11. An auxiliary control system as claimed in claim 10, in which said automatic measurement of total loop gain is by injecting pre-determined signals into said modulating means and measuring resulting outputs of said demodulating means.

12. An auxiliary control system as claimed in claim 11, in which two said total loop gain measurements are performed in succession with different injection signals and a result of said gain measurements is calculated from a difference between the said two gain measurements.

* * * * *